United States Patent [19]
Nakazono

[11] Patent Number: 5,583,642
[45] Date of Patent: Dec. 10, 1996

[54] METHOD OF DETERMINING COLOR TONE OF GLITTER-CONTAINING COATING

[75] Inventor: Daisuke Nakazono, Sayama, Japan

[73] Assignee: Honda Giken Kogyo Kabushiki Kaisha, Tokyo, Japan

[21] Appl. No.: 530,093

[22] Filed: Sep. 19, 1995

[30] Foreign Application Priority Data

Sep. 20, 1994 [JP] Japan .................... 6-224834

[51] Int. Cl.$^6$ ........................................ G01J 3/50
[52] U.S. Cl. ........................ 356/405; 356/425; 364/526
[58] Field of Search ........................ 356/402, 405, 356/406, 407, 425; 364/498, 526

[56] References Cited

U.S. PATENT DOCUMENTS

| | | | |
|---|---|---|---|
| 3,916,168 | 10/1975 | McCarty et al. | 356/405 |
| 4,479,718 | 10/1984 | Alman | 356/405 |
| 4,572,672 | 2/1986 | Orchard et al. | 356/446 |
| 4,692,481 | 9/1987 | Kelly | 356/405 |
| 4,711,580 | 12/1987 | Venable | 356/406 |
| 4,813,000 | 3/1989 | Wyman et al. | 356/402 |

FOREIGN PATENT DOCUMENTS

| | | |
|---|---|---|
| 57-11014 | 3/1982 | Japan . |
| 61-3016 | 1/1986 | Japan . |
| 61-61042 | 3/1986 | Japan . |
| 1-24256 | 5/1989 | Japan . |
| 3-36181 | 5/1991 | Japan . |
| 4-45769 | 7/1992 | Japan . |

*Primary Examiner*—F. L. Evans
*Attorney, Agent, or Firm*—Birch, Stewart, Kolasch & Birch, LLP

[57] ABSTRACT

Light reflected from a sample coating is measured in three directions that are angularly spaced by angles of about 15°, about 45°, and about 75° or about 110° from the direction of regular reflection of illuminating light toward the direction in which the illuminating light is applied. Color differences are then determined from the measured lights and known values of reference color tones, and one of the reference color tones whose color difference is minimum is determined. Flop values of the sample coating with respect to lightness, saturation, and hue are determined from the measured lights, and the color tone of the sample coating is determined based on color differences between the determined flop values and flop values that are characteristics of the reference color tones.

12 Claims, 3 Drawing Sheets

1

METHOD OF DETERMINING COLOR TONE OF GLITTER-CONTAINING COATING

BACKGROUND OF THE INVENTION

1. Field of the Invention

The present invention relates to a method of determining highly accurately the color tone of a coating which contains glitter.

2. Description of the Related Art

It is of great importance to determine the color tone of a coating such as a coating on an automobile body or the like for the purpose of obtaining a coated product with a desired appearance. Heretofore, the color tone of a coated surface has been determined by a skilled worker who visually compares the color tone of the coated surface and the color tones of reference patches.

However, since such a visual checking process needs a high level of skill on the part of the inspector, it has recently been proposed to measure color tones according to spectrocolorimetry. While the spectrocolorimetric process is capable of measuring the color tones of solid paint coatings, it fails to make accurate measurements of the color tones of coated surfaces produced of paints containing luster pigments known as flitter, such as metallic paints containing flakes or fragments of aluminum or the like.

FIGS. 3A and 3B of the accompanying drawings show metallic coatings on workpieces. Each of the illustrated metallic coatings comprises an inner coating layer 2, a base coating layer 4 disposed on the inner coating layer 2, and a clear coating layer 6 disposed on the base coating layer 4. The base coating layer 4 contains a luster pigment or flitter A composed of fine metal fragments or flakes such as flakes of aluminum, for example. When light reflected from the metallic coating is measured, the measured value varies depending on the orientation of the flitter A, an effect known as "flip-flop".

Japanese laid-open patent publication No. 61-61042, for example, discloses a method of measuring the color tone of a coated surface produced of a paint containing flitter. According to the disclosed method, illuminating light is applied to the coated surface, and light reflected by the coated surface is measured at angles of 15°, 45°, and 110° from the direction in which the light is reflected according to regular reflection (the direction of regular reflection). A flop value FLOP is then determined from the values of lightness of the light reflected at the angles of 15°, 45°, and 110° according to the following equation:

$$FLOP = K \cdot \frac{(L^*_{15} - L^*_{45})^a}{L^{*b}_{110}}$$

where k, a, b are predetermined coefficients. Using the flop value FLOP, it is possible to determine, with high accuracy, the characteristics of the color tone that varies depending on the direction in which it is observed.

The disclosed method can produce measured results that are satisfactory to some extent for paints such as solid paints, metallic paints, and pearlescent paints. However, it fails to provide a high degree of measuring accuracy with respect to interference mica colors, low-lightness colors, and colors of paints containing new glitter.

SUMMARY OF THE INVENTION

It is therefore an object of the present invention to provide a method of determining highly accurately and efficiently the color tones of coatings produced of various paints which contain glitter.

Another object of the present invention is to provide a method of determining accurately the color tone of a coating depending on the paint of the coating.

Still another object of the present invention is to provide a method of determining the color tone of a coating by establishing a reference color tone closest to the color tone that is to be determined.

According to the present invention, there is provided a method of determining the color tone of a coating which contains glitter, comprising the steps of (a) measuring light reflected from a sample coating which contains glitter when the sample coating is illuminated with illuminating light at an angle of about 45° from the normal to the sample coating, in three directions that are angularly spaced by angles of about 15°, about 45°, and about 75° or about 110° from the direction of regular reflection of illuminating light toward the direction in which the sample coating is illuminated with illuminating light, (b) determining directional reflection characteristic values with respect to lightness, saturation, and hue from reflected lights from the sample coating which are measured respectively in the three directions, (c) determining at least one of a lightness difference, a saturation difference, and a hue difference of directional reflection characteristic values from directional reflection characteristic values of reference color tones with respect to lightness, saturation, and hue and the directional reflection characteristic values determined in the step (b), and (d) determining the color tone of the sample coating based on at least one of the lightness difference, the saturation difference, and the hue difference which is selected depending on color tone characteristics of the reference color tones.

According to the present invention, there is also provided a method of determining the color tone of a coating which contains glitter, comprising the steps of (a) measuring light reflected from a sample coating which contains glitter when the sample coating is illuminated with illuminating light at an angle of about 45° from the normal to the sample coating, in three directions that are angularly spaced by angles of about 15°, about 45°, and about 75° or about 110° from the direction of regular reflection of illuminating light toward the direction in which the sample coating is illuminated with illuminating light, (b) determining color differences of a plurality of reference color tones from reflected light measured respectively in the three directions and reflected lights from the reference color tones which are measured respectively in the three directions, (c) selecting one of the reference color tones whose color difference is minimum, (d) determining directional reflection characteristic values with respect to lightness, saturation, and hue from the reflected lights from the sample coating which are measured respectively in the three directions, (e) determining at least one of a lightness difference, a saturation difference, and a hue difference of directional reflection characteristic values from directional reflection characteristic values with respect to lightness, saturation, and hue of the one of the reference color tones which is selected in the step (c), and the directional reflection characteristic values which are determined in the step (d), and (f) determining the color tone of the sample coating based on at least one of the lightness difference, the saturation difference, and the hue difference which is selected depending on color tone characteristics of the selected one of the reference color tones.

The directional reflection characteristic value L*FLOP of lightness, the directional reflection characteristic value C*FLOP of saturation, and the directional reflection characteristic value H*FLOP of hue are determined, using lightness $L^*_{15}$, saturation $C^*_{15}$, and hue $H^*_{15}$ measured at about 15°, lightness $L^*_{45}$, saturation $C^*_{45}$, and hue $H^*_{45}$ measured at about 45°, and lightness $L^*_{75(110)}$, saturation $C^*_{75(110)}$, and hue $H^*_{75(110)}$ measured at about 75° or 110°, as follows:

$$L^*FLOP = C_L \cdot \frac{(L^*_{15} - L^*_{75(110)})/S_{L15}}{L^*_{45}/S_{L45}}$$

$$C^*FLOP = C_C \cdot (C^*_{15} - C^*_{75(110)})/S_{C15}$$
$$H^*FLOP = C_H \cdot (H^*_{15} - H^*_{75(110)})/S_{H15}$$

where $C_L$, $C_C$, $C_H$: coefficients for correlating the scales of the respective directional reflection characteristic values, if $L^*_{15} < 16$, then $S_{L15} = 0.511$,
if $L^*_{15} \geq 16$, then $S_{L15} = 0.040975 \cdot L^*_{15}/(1+0.01765 \cdot L^*_{15})$,
if $L^*_{45} < 16$, then $S_{L45} = 0.511$,
if $L^*_{45} \geq 16$, then $S_{L45} = 0.040975 \cdot L^*_{45}/(1+0.01765 \cdot L^*_{45})$,
$S_{C15} = 0.0638 \cdot C^*_{15}/(1+0.0131 \cdot C^*_{15})+0.638$,
$S_{H15} = S_{C15} \cdot (T \cdot f + 1 - f)$, $$f = \left\{ \frac{(C^*_{15})^4}{(C^*_{15})^4 + 1900} \right\}^{1/2},$$

$T = 0.36 + |0.4 \cdot \cos(h_{15} + 35)|$,
$h_{15} = \tan^{-1}(a^*_{15}/b^*_{15})$.

The angles at which the light reflected from the sample coating may be measured in the step (a) comprise 15°±10°, 45°±10°, and 75°±10° or 110°±10°, respectively.

The reflected light measured in the direction which is angularly spaced by the angle of about 75° or about 110° from the direction of regular reflection of illuminating light toward the direction in which the sample coating is illuminated with illuminating light, may comprise reflected light representing the undertone of the sample coating.

The angles at which the light reflected from the sample coating is measured in the step (a) may be determined with respect to a reference direction in which a maximum intensity of reflected light is detected and which is selected as the direction of regular reflection.

The lightness difference, the saturation difference, or the hue difference of directional reflection characteristic values may be determined as a weighted mean ΔF of color differences according to:

$$\Delta F = K_L \cdot \Delta L^*FLOP + K_C \cdot \Delta C^*FLOP + K_H \cdot \Delta H^*FLOP$$

where $K_L$, $K_C$, $K_H$ are weighting coefficients established for the lightness, saturation, and hue of the reference color tones.

The above and other objects, features, and advantages of the present invention will become apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
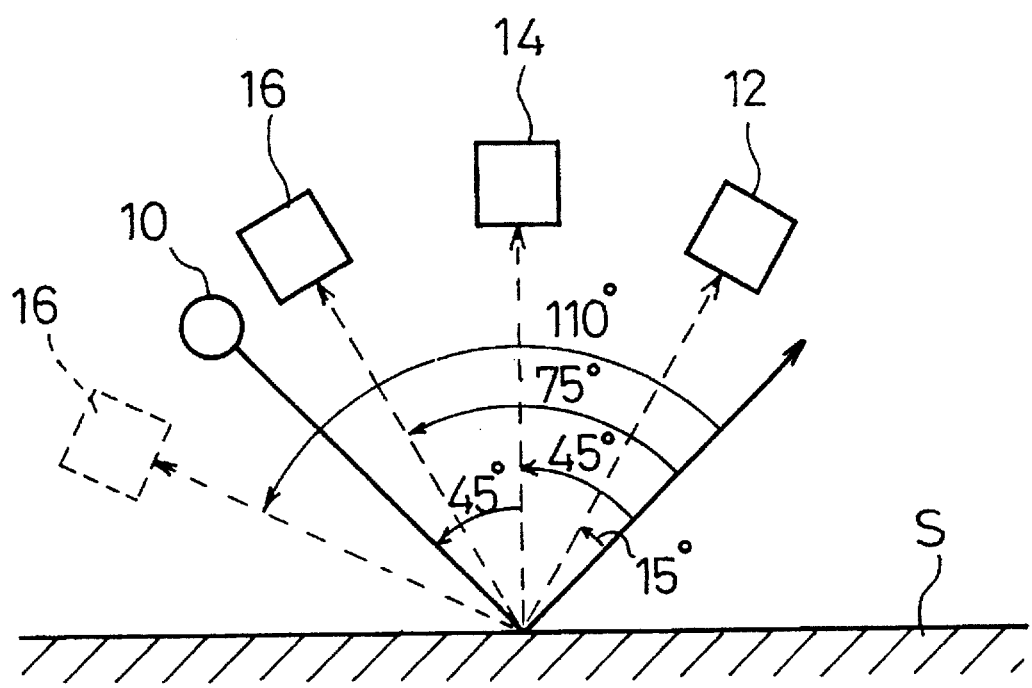
FIG. 1 is a schematic view of a measuring device for carrying out a method of determining the color tone of a coating according to the present invention.

FIG. 1 schematically shows a measuring device for carrying out a method of determining the color tone of a coating according to the present invention. As shown in FIG. 1, the measuring device has an illuminating light source 10 positioned above a sample coating S at an angle of about 45° from the normal to the sample coating S. The measuring device also has an array of three sensors 12, 14, 16 positioned above the sample coating S. The sensor 12 serves to detect reflected light, close to light of regular reflection, from the sample coating S when the sample coating S is illuminated with light from the illuminating light source 10, the sensor 12 being angularly spaced an angle of about 15°(15°±10°) from the direction of regular reflection toward the illuminating light source 10. The sensor 14 serves to detect reflected light along the normal to the sample coating S, the sensor 14 being angularly spaced about an angle of about 45°(45°±10°) from the direction of regular reflection toward the illuminating light source 10. The sensor 16 serves to detect reflected light generally toward the illuminating light source 10, the sensor 16 being angularly spaced an angle of about 75°(75°±10°) or 110°(110°±10°) from the direction of regular reflection toward the illuminating light source 10. The sensor 16 can measure the undertone of the sample coating S.

It was observed that when the illuminating light source 10 was angularly spaced 30° from the normal to the sample coating S, coatings of solid, metallic, and white pearlescent paints exhibited widely different colorimetric values, and that when the illuminating light source 10 was angularly spaced 45° from the normal to the sample coating S, the differences between the colorimetric values of the coatings of solid, metallic, and white pearlescent paints were small. It was also observed that when the sensor 12 was angularly spaced 25° from the direction of regular reflection, the lightness differences between coatings of metallic paints were small and the matching between color differences and visual evaluations of the undertones of coatings of pearlescent paints was low, and that when the sensor 12 was angularly spaced 15° from the direction of regular reflection, the matching between lightnesses and lightness differences between coatings of metallic paints was high and the matching between colorimetric values and color differences of coatings of pearlescent paints was high. It was further observed that when the sensor 16 was angularly spaced 75° from the direction of regular reflection, the matching between colorimetric values of the undertones of coatings of metallic and pearlescent paints was high, and that when the sensor 16 was angularly spaced 110° from the direction of regular reflection, relatively good results were obtained. Therefore, the positions of the sensors 12, 14, 16 were selected to be angularly spaced 15°, 45°, 75° or 110°, respectively, from the direction of regular reflection.

If the sample coating S is of a curved surface, the sensors 12, 14, 16 can easily and accurately be positioned by making the sensors 12, 14, 16 positionally adjustable, selecting the direction in which a maximum intensity of reflected light is detected by the sensor 12 as the direction of regular reelection, and positioning the sensors 12, 14, 16 with respect to the direction of regular reelection as a reference direction.

Figure 2:
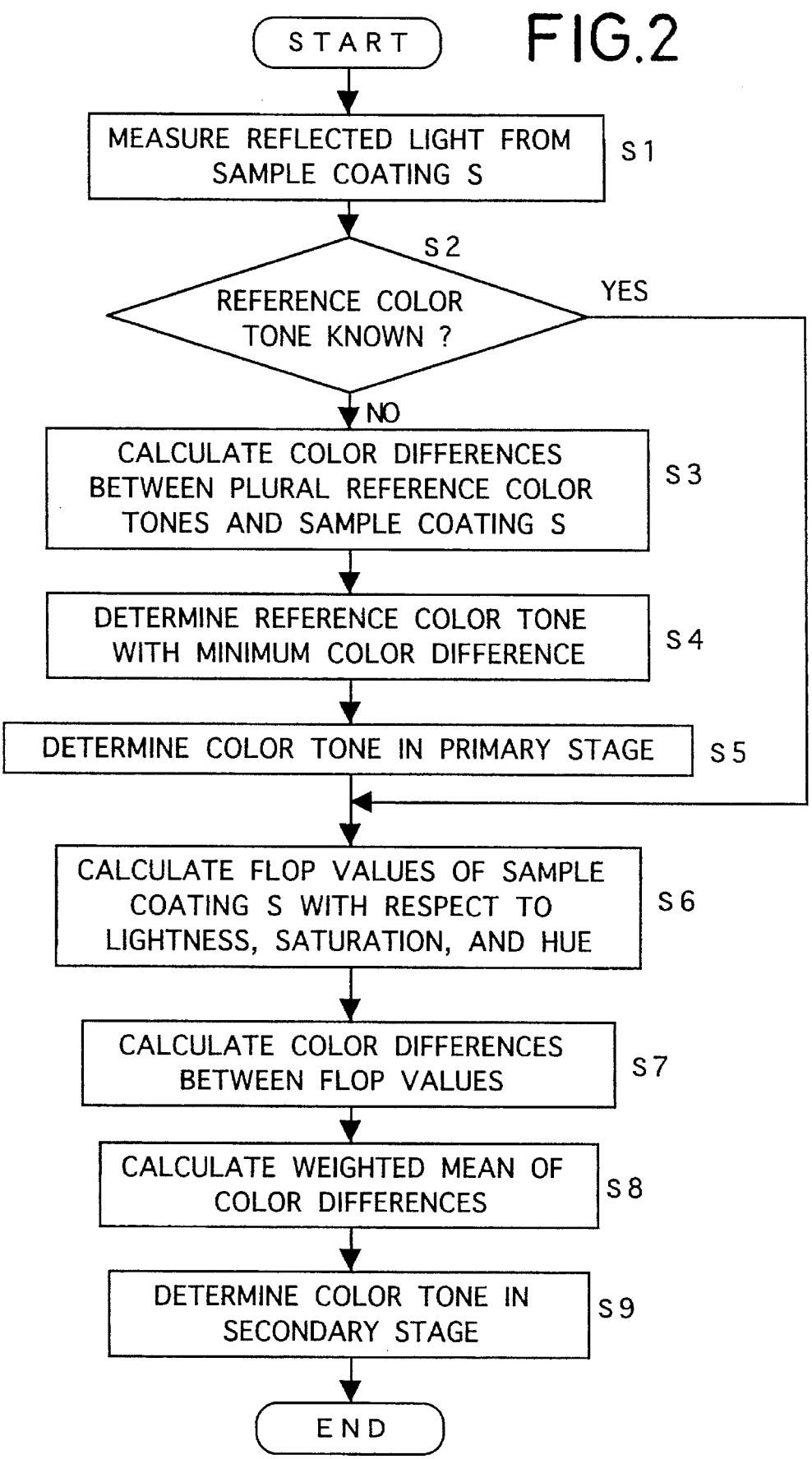
FIG. 2 is a flowchart of a processing sequence of the method according to the present invention.
Figure 3A:
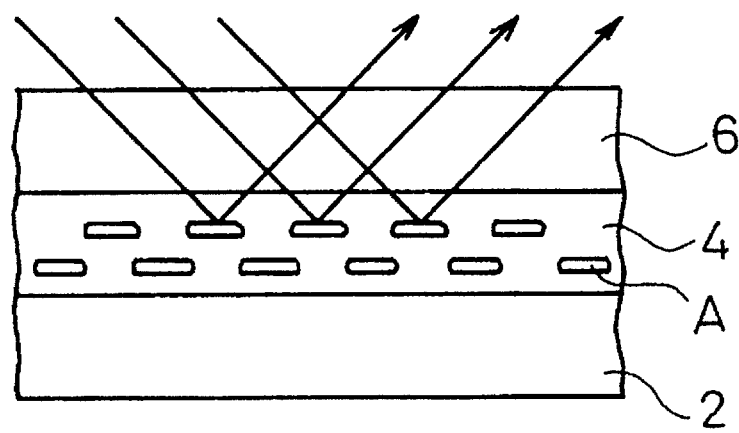
FIGS. 3A and 3B are views showing the manner in which light is reflected by metallic paint coatings.
Figure 3B:
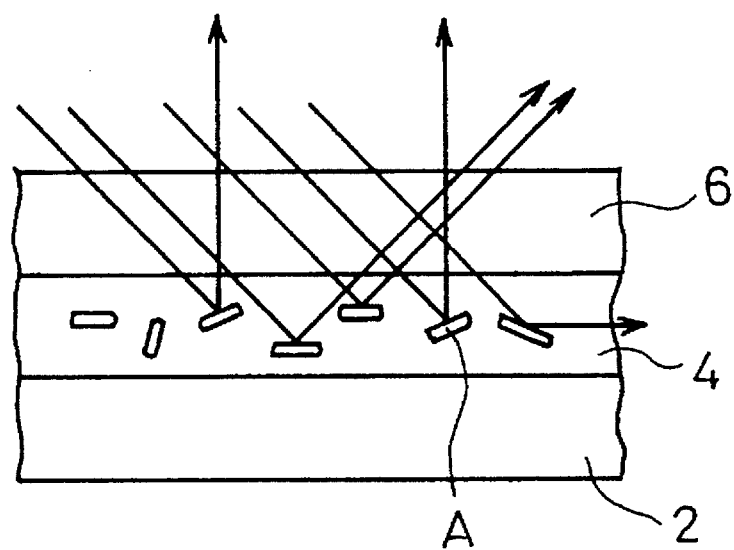

A method of determining the color tone of the sample coating S with the measuring device shown in FIG. 1 will be described below with reference to FIG. 2.

Light reflected from the sample coating S when it is illuminated with light emitted by the illuminating light source 10 is measured by the sensors 12, 14, 16 in a step S1. From the measured light, there are determined lightnesses $L^*_{15}, L^*_{45}, L^*_{75(110)}$ and chromaticities $a^*_{15}, a^*_{45}, a^*_{75(110)}, b^*_{15}, b^*_{45}, b^*_{75(110)}$ in a CIEL*a*b* colorimetric system. The suffixes of the lightnesses and the chromaticities represent angles.

Then, if a reference color tone close to the color tone of the sample coating S is not known ("NO" in a step S2), then color differences $\Delta E_{15}, \Delta E_{45}, \Delta E_{75(110)}$ between a plurality of reference color tones prepared in advance and the color tone of the sample coating S measured by the sensors 12, 14, 16 are calculated in a step S3. For example, the color difference $\Delta E_{15}$ is determined according the equation:

$$\Delta E_{15}((\Delta L^*_{15})^2 + (\Delta a^*_{15})^2 + (\Delta b^*_{15})^2)^{1/2}$$

where $\Delta L^*_{15}, \Delta a^*_{15}, \Delta b^*_{15}$ represent the differences between the lightnesses and chromaticities of the reference color tone and the sample coating S.

Similarly, the color differences $\Delta E_{45}, \Delta E_{75(100)}$ are determined according to similar equations. A color tone whose color difference $\Delta E$ which is given as the sum of the color differences $\Delta E_{15}, \Delta E_{45}, \Delta E_{75(100)}$ is minimum is now determined as a reference color tone close to the color tone of the sample coating S in a step S4.

By repeating the above process for each of a plurality of available sample coatings S, the sample coatings S are divided into groups associated respectively with the reference color tones, and the color tones of the sample coatings S in the groups are determined in a primary stage. Tables 1 through 3, given below, show a group of sample coatings S having a color tone of blue green pearl, a group of sample coatings S having a color tone of silver metallic, and a group of sample coatings S having a color tone of wine red pearl, respectively. In each of Tables 1 through 3, the sample coatings S are arranged in the order of color differences $\Delta E$. The order of color differences $\Delta E$ of the sample coatings S and the order of visual evaluations thereof are in good agreement with each other. With respect to those sample coatings S with small color differences $\Delta E$ shown in Tables 4 through 6, however, the order of color differences $\Delta E$ of the sample coatings S and the order of visual evaluations thereof do not agree with each other.

In Tables 1 through 3, the item "Evaluation" to a color tone determined in a primary stage is shown by marks which represent ⊙ for Excellent, ○ for Good, Δ for Average and X for Below Average, respectively.

With respect to the sample coatings S with small color differences $\Delta E$, directional reflection characteristic values (hereinafter referred to as flop values FLOP) with respect to lightness, saturation, and hue are calculated in a step S6. Specifically, using the lightness $L^*_{15}$, saturation $C^*_{15}$, and hue $H^*_{15}$ measured by the sensor 12 the lightness $L^*_{45}$ saturation $C^*_{45}$ and hue $H^*_{45}$ measured by the sensor 14, and the lightness $L^*_{75(110)}$, saturation $C^*_{75(110)}$, and hue $H^*_{75(100)}$ measured by the sensor 16, a flop value L*FLOP of lightness, a flop value C*FLOP of saturation, and a flop value H*FLOP of hue are determined according to the following equations:

$$L^*FLOP = C_L \cdot \frac{(L^*_{15} - L^*_{75(110)})/S_{L15}}{L^*_{45}/S_{L45}}$$

$$C^*FLOP = C_C \cdot (C^*_{15} - C^*_{75(110)})/S_{C15}$$
$$H^*FLOP = C_H \cdot (H^*_{15} - H^*_{75(110)})/S_{H15}$$

where $C_L, C_C, C_H$: coefficients for correlating the scales of the respective directional reflection characteristic values,
if $L^*_{15} < 16$, then $S_{L15} = 0.511$,
if $L^*_{15} \geq 16$, then $S_{L15} = 0.040975 \cdot L^*_{15}/(1 + 0.01765 \cdot L^*_{15})$,
if $L^*_{45} < 16$, then $S_{L45} = 0.511$, if $L^*_{45} \geq 16$, then $S_{L45} = 0.040975 \cdot L^*_{45}/(1 + 0.01765 \cdot L^*_{45})$,
$S_{C15} = 0.0638 \cdot C^*_{15}/(1 + 0.0131 \cdot C^*_{15}) + 0.638$,
$S_{H15} = S_{C15} \cdot (T \cdot f + 1 - f)$, $$f = \left\{ \frac{(C^*_{15})^4}{(C^*_{15})^4 + 1900} \right\}^{1/2},$$

$T = 0.36 + |0.4 \cdot \cos(h_{15} + 35)|$,
$h_{15} = \tan^{-1}(a^*_{15}/b^*_{15})$.

The above equations are CMC color difference equations which have improved on CIEL*a*b* color difference equations.

Then, color differences $\Delta L^*FLOP, \Delta C^*FLOP, \Delta H^*FLOP$ between the flop values L*FLOP, C*FLOP, H*FLOP thus calculated and the flop values of the reference color tones are determined in a step S7. The color differences thus determined, which are characteristic of the reference color tones and correspond to the flop values relative to lightness, saturation, and hue, are weighted, and the weighted mean of the color differences is determined in a step S8. Specifically, the weighted mean $\Delta F$ of the color differences is calculated according to the equation:

$$\Delta F = K_L \cdot \Delta L^*FLOP + K_C \cdot \Delta C^*FLOP + K_H \cdot \Delta H^*FLOP$$

where $K_L, K_C, K_H$ are weighting coefficients established for the lightness, saturation, and hue of the reference color tones. The weighting coefficients may be selected to be $K_L = K_H = 1$, $K_C = 0$ with respect to blue green pearl, $K_L = 1$, $K_C = K_H = 0$ with respect to silver metallic, and $K_L = K_C = 1$, $K_H = 0$ with respect to wine red pearl for thereby automatizing the process of determining the color tone of a coating.

The sample coatings S are arranged in the order of the weighted means $\Delta F$ of color differences, and the color tones of the sample coatings S are determined in a secondary stage in a step S9. Tables 4 through 6 show the sample coatings that are arranged in the order of the weighted means $\Delta F$ of color differences. The order of visual evaluations and the order of the weighted means $\Delta F$ of color differences are in full agreement with each other.

In Tables 4 through 6, the item "Evaluation" to a color tone determined in a secondary stage is shown by marks which represent ⊙ for Excellent, ○ for Good, Δ for Average, X for Below Average and XX for Failing, respectively.

Therefore, it is possible to determine highly accurately and efficiently the color tones of coatings produced of paints which contain glitter. If it is known which reference color tone a sample coating S belongs to, then the steps S1 through S5 shown in FIG. 2 can be dispensed with.

TABLE 1

| Color tone | | BGP1 | BGP2 | BGP3 | BGP4 | BGP5 |
|---|---|---|---|---|---|---|
| | | \multicolumn{5}{c}{Blue green pearl (Indigo containing mica)} | | | | |
| Order | A | 1 | 2 | 3 | 4 | 5 |
| of | B | 1 | 2 | 4 | 3 | 5 |
| visual | C | 1 | 2 | 3 | 4 | 5 |
| evalua- | D | 1 | 2 | 3 | 4 | 5 |
| tions | E | 1 | 2 | 3 | 4 | 5 |
| | Dispersion | 1 | 2 | 3–4 | 3–4 | 5 |
| | Average | 1 | 2 | 3.2 | 3.8 | 5 |
| ΔE (color differences) | | 0.51 | 1.07 | 1.58 | 2.02 | 2.61 |
| Evaluation | | ⊙ | ⊙ | ○ | ○ | Δ |

TABLE 2

| Color tone | | Sample coating No. | | | | |
|---|---|---|---|---|---|---|
| | | NHM1 | NHM2 | NHM3 | NHM4 | NHM5 |
| | | Silver metallic (Metallic silver of enamel) | | | | |
| Order of visual evaluations | A | 1 | 2 | 3 | 4 | 5 |
| | B | 1 | 2 | 3 | 4 | 5 |
| | C | 1 | 2 | 3 | 4 | 5 |
| | D | 1 | 2 | 3 | 4 | 5 |
| | E | 1 | 2 | 3 | 4 | 5 |
| Dispersion | | 1 | 2 | 3 | 4 | 5 |
| Average | | 1 | 2 | 3 | 4 | 5 |
| ΔE (color differences) | | 0.87 | 1.75 | 2.83 | 3.61 | 4.52 |
| Evaluation | | ⊙ | ○ | Δ | x | x |

TABLE 3

| Color tone | | Sample coating No. | | | | |
|---|---|---|---|---|---|---|
| | | RP1 | RP2 | RP3 | RP4 | RP5 |
| | | Wine red pearl (Dark red containing mica) | | | | |
| Order of visual evaluations | A | 1 | 2 | 3 | 4 | 5 |
| | B | 1 | 2 | 3 | 5 | 4 |
| | C | 1 | 2 | 3 | 5 | 4 |
| | D | 1 | 2 | 3 | 4 | 5 |
| | E | 1 | 2 | 3 | 4 | 5 |
| Dispersion | | 1 | 2 | 3 | 4~5 | 4~5 |
| Average | | 1 | 2 | 3 | 4.4 | 4.6 |
| ΔE (color differences) | | 0.31 | 0.87 | 1.34 | 1.81 | 2.01 |
| Evaluation | | ⊙ | ⊙ | ○ | ○ | ○ |

TABLE 4

| Sample coating No. | | BGP 21 | BGP 28 | BGP 29 | BGP 37 | BGP 42 | BGP 44 | BGP 46 | BGP 50 | BGP 61 |
|---|---|---|---|---|---|---|---|---|---|---|
| | | | | | | | | | Color tone: Blue green pearl | |
| ΔE (color differences) | | 0.95 | 0.98 | 1.02 | 1.01 | 1.07 | 0.99 | 1.02 | 1.04 | 0.96 |
| Order of visual evaluations | A | 1 | 2 | 3 | 4 | 5 | 7 | 6 | 8 | 9 |
| | B | 1 | 2 | 4 | 3 | 5 | 6 | 7 | 8 | 9 |
| | C | 2 | 1 | 4 | 3 | 7 | 6 | 5 | 9 | 8 |
| | D | 1 | 2 | 3 | 4 | 6 | 5 | 7 | 8 | 9 |
| | E | 1 | 2 | 3 | 4 | 5 | 7 | 6 | 9 | 8 |
| Dispersion | | 1~2 | 1~2 | 3~4 | 3~4 | 5~7 | 5~7 | 5~7 | 8~9 | 8~9 |
| Average | | 1.2 | 1.8 | 3.4 | 3.6 | 5.6 | 6.2 | 6.2 | 8.4 | 8.6 |
| ΔL*FLOP | | 0.05 | 0.06 | 0.04 | 0.14 | 0.04 | 0.23 | 0.13 | 0.22 | 0.21 |
| ΔC*FLOP | | 0.04 | 0.24 | 0.04 | 0.05 | 0.06 | 0.06 | 0.03 | 0.06 | 0.23 |
| ΔH*FLOP | | 0.07 | 0.06 | 0.17 | 0.07 | 0.25 | 0.05 | 0.16 | 0.24 | 0.23 |
| FLOP as a point | | | | | | L* H* | | | | |
| Evaluation | | ⊙ | ○ | Δ | Δ | x | x | x | x x | x x |

TABLE 5

| Sample coating No. | | NHM 15 | NHM 20 | NHM 22 | NHM 45 | NHM 47 | NHM 51 | NHM 53 |
|---|---|---|---|---|---|---|---|---|
| | | | | | | | Color tone: Silver metallic | |
| ΔE (color differences) | | 1.01 | 0.97 | 0.98 | 1.04 | 0.96 | 0.96 | 1.03 |
| Order of visual evaluations | A | 1 | 2 | 3 | 4 | 5 | 6 | 7 |
| | B | 1 | 3 | 2 | 4 | 5 | 7 | 6 |
| | C | 1 | 2 | 4 | 3 | 5 | 6 | 7 |
| | D | 1 | 3 | 4 | 2 | 5 | 6 | 7 |
| | E | 1 | 2 | 3 | 4 | 5 | 7 | 6 |
| Dispersion | | 1 | 2~3 | 2~4 | 2~4 | 5 | 6~7 | 6~7 |
| Average | | 1 | 2.4 | 3.2 | 3.4 | 5 | 6.4 | 6.6 |
| ΔL*FLOP | | 0.03 | 0.03 | 0.04 | 0.06 | 0.14 | 0.23 | 0.24 |
| ΔC*FLOP | | 0.04 | 0.03 | 0.26 | 0.23 | 0.03 | 0.04 | 0.21 |
| ΔH*FLOP | | 0.06 | 0.23 | 0.05 | 0.24 | 0.05 | 0.07 | 0.26 |
| FLOP as a point | | | | | L* | | | |
| Evaluation | | ⊙ | ○ | ○ | ○ | Δ | x | x |

TABLE 6

Color tone: Wine red pearl

| Sample coating No. | | RP11 | RP16 | RP29 | RP33 | RP34 | RP59 | RP62 | RP64 | RP73 |
|---|---|---|---|---|---|---|---|---|---|---|
| ΔE (color differences) | | 0.98 | 1.07 | 0.96 | 0.97 | 1.03 | 1.01 | 0.99 | 1.04 | 1.00 |
| Order | A | 1 | 2 | 3 | 5 | 4 | 6 | 7 | 8 | 9 |
| of | B | 1 | 2 | 4 | 3 | 5 | 6 | 7 | 8 | 9 |
| visual | C | 1 | 2 | 3 | 4 | 5 | 7 | 6 | 8 | 9 |
| evalua- | D | 1 | 2 | 4 | 3 | 5 | 7 | 6 | 9 | 8 |
| tions | E | 2 | 1 | 3 | 5 | 4 | 6 | 7 | 9 | 8 |
| | Dispersion | 1–2 | 1–2 | 3–4 | 3–5 | 4–5 | 6–7 | 6–7 | 8–9 | 8–9 |
| | Average | 1.2 | 1.8 | 3.4 | 4.0 | 4.6 | 6.4 | 6.6 | 8.4 | 8.6 |
| ΔL*FLCP | | 0.03 | 0.04 | 0.05 | 0.14 | 0.15 | 0.04 | 0.23 | 0.22 | 0.23 |
| ΔC*FLOP | | 0.06 | 0.07 | 0.13 | 0.05 | 0.14 | 0.26 | 0.05 | 0.28 | 0.26 |
| ΔH*FLOP | | 0.07 | 0.28 | 0.05 | 0.07 | 0.06 | 0.07 | 0.08 | 0.06 | 0.24 |
| FLOP as a point | | | | | | L* C* | | | | |
| Evaluation | | ⊙ | ○ | Δ | Δ | Δ | x | x | x x | x x |

According to the present invention, as described above, the color differences between directional reflection characteristic values of sample coatings produced of various paints containing glitter and directional reflection characteristic values of reference color tones are determined with respect to lightness, saturation, and hue, and the color tones of the sample coatings are determined based on the color differences which are characteristic of the reference color tones. Accordingly, the color tone of a sample coating can be determined highly accurately and efficiently.

Although a certain preferred embodiment of the present invention has been shown and described in detail, it should be understood that various changes and modifications may be made therein without departing from the scope of the appended claims.

What is claimed is:

1. A method of determining the color tone of a coating which contains glitter, comprising the steps of:

(a) measuring light reflected from a sample coating which contains glitter when the sample coating is illuminated with illuminating light at an angle of about 45° from the normal to the sample coating, in three directions that are angularly spaced by angles of about 15°, about 45°, and about 75° or about 110° from the direction of regular reflection of illuminating light toward the direction in which the sample coating is illuminated with illuminating light;

(b) determining directional reflection characteristic values with respect to lightness, saturation, and hue from reflected lights from the sample coating which are measured respectively in said three directions;

(c) determining at least one of a lightness difference, a saturation difference, and a hue difference of directional reflection characteristic values from directional reflection characteristic values of reference color tones with respect to lightness, saturation, and hue and said directional reflection characteristic values determined in said step (b); and (d) determining the color tone of the sample coating based on at least one of the lightness difference, the saturation difference, and the hue difference which is selected depending on color tone characteristics of said reference color tones.

2. The method according to claim 1, wherein the directional reflection characteristic value L*FLOP of lightness, the directional reflection characteristic value C*FLOP of saturation, and the directional reflection characteristic value H*FLOP of hue are determined, using lightness $L^*_{15}$, saturation $C^*_{15}$, and hue $H^*_{15}$ measured at about 15° lightness $L^*_{45}$, saturation $C^*_{45}$, and hue $H^*_{45}$ measured at about 45°, and lightness $L^*_{75(110)}$, saturation $C^*_{75(110)}$, and hue $H^*_{75(110)}$ measured at about 75° or 110°, as follows:

$$L^*FLOP = C_L \cdot \frac{(L^*_{15} - L^*_{75(110)})/S_{L15}}{L^*_{45}/S_{L45}}$$

$$C^*FLOP = C_C \cdot (C^*_{15} - C^*_{75(110)})/S_{C15}$$
$$H^*FLOP = C_H \cdot (H^*_{15} - H^*_{75(110)})/S_{H15}$$

where $C_L$, $C_C$, $C_H$: coefficients for correlating the scales of the respective directional reflection characteristic values, if $L^*_{15} < 16$, then $S_{L15} = 0.511$,
if $L^*_{15} \geq 16$, then $S_{L15} = 0.040975 \cdot L^*_{15}/(1+0.01765 \cdot L^*_{15})$,
if $L^*_{45} < 16$, then $S_{L44} = 0.511$,
if $L^*_{45} \geq 16$, then $S_{L45} = 0.040975 \cdot L^*_{45}/(1+0.01765 \cdot L^*_{45})$,
$S_{C15} = 0.0638 \cdot C^*_{15}/(1+0.0131 \cdot C^*_{15})+0.638$,
$S_{H15} = S_{C15} \cdot (T \cdot f + 1 - f)$, $$f = \left\{ \frac{(C^*_{15})^4}{(C^*_{15})^4 + 1900} \right\}^{1/2},$$

$T = 0.36 + |0.4 \cdot \cos(h_{15} + 35)|$,
$h_{15} = \tan^{-1}(a^*_{15}/b^*_{15})$.

3. The method according to claim 1, wherein said angles at which the light reflected from the sample coating is measured in the step (a) comprise 15°±10°, 45°±10°, and 75°±10° or 110°±10°, respectively.

4. The method according to claim 1, wherein the reflected light measured in the direction which is angularly spaced by the angle of about 75° or about 110° from the direction of regular reflection of illuminating light toward the direction in which the sample coating is illuminated with illuminating light, comprises reflected light representing the undertone of the sample coating.

5. A method according to claim 1, wherein said angles at which the light reflected from the sample coating is measured in the step (a) are determined with respect to a reference direction in which a maximum intensity of reflected light is detected and which is selected as the direction of regular reelection.

6. The method according to claim 2, wherein the lightness difference, the saturation difference, or the hue difference of directional reflection characteristic values are determined as a weighted mean ΔF of color differences according to:

$$\Delta F = K_L \cdot \Delta L^*FLOP + K_C \cdot \Delta C^*FLOP + K_H \cdot \Delta H^*FLOP$$

where $K_L$, $K_C$, $K_H$ are weighting coefficients established for the lightness, saturation, and hue of the reference color tones.

7. A method of determining the color tone of a coating which contains glitter, comprising the steps of:
   (a) measuring light reflected from a sample coating which contains glitter when the sample coating is illuminated with illuminating light at an angle of about 45° from the normal to the sample coating, in three directions that are angularly spaced by angles of about 15°, about 45°, and about 75° or about 110° from the direction of regular reflection of illuminating light toward the direction in which the sample coating is illuminated with illuminating light;
   (b) determining color differences of a plurality of reference color tones from reflected light measured respectively in the three directions and reflected lights from the reference color tones which are measured respectively in said three directions;
   (c) selecting one of said reference color tones whose color difference is minimum;
   (d) determining directional reflection characteristic values with respect to lightness, saturation, and hue from the reflected lights from the sample coating which are measured respectively in said three directions;
   (e) determining at least one of a lightness difference, a saturation difference, and a hue difference of directional reflection characteristic values from directional reflection characteristic values with respect to lightness, saturation, and hue of the one of said reference color tones which is selected in the step (c), and said directional reflection characteristic values which are determined in the step (d); and
   (f) determining the color tone of the sample coating based on at least one of the lightness difference, the saturation difference, and the hue difference which is selected depending on color tone characteristics of the selected one of said reference color tones.

8. The method according to claim 7, wherein the directional reflection characteristic value L*FLOP of lightness, the directional reflection characteristic value C*FLOP of saturation, and the directional reflection characteristic value H*FLOP of hue are determined, using lightness $L^*_{15}$, saturation $C^*_{15}$, and hue $H^*_{15}$ measured at about 15°, lightness $L^*_{45}$, saturation $C^*_{45}$, and hue $H^*_{45}$ measured at about 45°, and lightness $L^*_{75(110)}$, saturation $C^*_{75(110)}$, and hue $H^*_{75(110)}$ measured at about 75° or 110°, as follows:

$$L^*FLOP = C_L \cdot \frac{(L^*_{15} - L^*_{75(110)})/S_{L15}}{L^*_{45}/S_{45}}$$

$$C^*FLOP = C_C \cdot (C^*_{15} - C^*_{75(110)})/S_{C15}$$
$$H^*FLOP = C_H \cdot (H^*_{15} = H^*_{75(110)})/S_{H15}$$

where $C_L$, $C_C$, $C_H$: coefficients for correlating the scales of the respective directional reflection characteristic values, if $L^*_{15} < 16$, then $S_{L15} = 0.511$, if $L^*_{15} \geq 16$, then $S_{L15} = 0.040975 \cdot L^*_{15}/(1 + 0.01765 \cdot L^*_{15})$, if $L^*_{45} < 16$, then $S_{L45} = 0.511$, if $L^*_{45} > 16$, then $S_{L45} = 0.040975 \cdot L^*_{45}/(1 + 0.01765 \cdot L^*_{45})$, $S_{C15} = 0.0638 \cdot C^*_{15}/(1 + 0.0131 \cdot C^*_{15}) + 0.638$, $S_{H15} = S_{C15} \cdot (T \cdot f + 1 - f)$, $$f = \left\{ \frac{(C^*_{15})^4}{(C^*_{15})^4 + 1900} \right\}^{1/2},$$

$T = 0.36 + |0.4 \cdot \cos(h_{15} + 35)|$, $h_{15} = \tan^{-1}(a^*_{15}/b^*_{15})$.

9. The method according to claim 7, wherein said angles at which the light reflected from the sample coating is measured in the step (a) comprise 15°±10°, 45°±10° and 75°±10° or 110°±10°, respectively.

10. The method according to claim 7, wherein the reflected light measured in the direction which is angularly spaced by the angle of about 75° or about 110° from the direction of regular reflection of illuminating light toward the direction in which the sample coating is illuminated with illuminating light, comprises reflected light representing the undertone of the sample coating.

11. The method according to claim 2, wherein said angles at which the light reflected from the sample coating is measured in the step (a) are determined with respect to a reference direction in which a maximum intensity of reflected light is detected and which is selected as the direction of regular reelection.

12. The method according to claim 8, wherein the lightness difference, the saturation difference, or the hue difference of directional reflection characteristic values are determined as a weighted mean ΔF of color differences according to:

$$\Delta F = K_L \cdot \Delta L^*FLOP + K_C \cdot \Delta C^*FLOP + K_H \cdot \Delta H^*FLOP$$

where $K_L$, $K_C$, $K_H$ are weighting coefficients established for the lightness, saturation, and hue of the reference color tones.

* * * * *